J. WOOD.
SHOCK ABSORBER.
APPLICATION FILED JAN. 30, 1920.
1,391,035.
Patented Sept. 20, 1921.
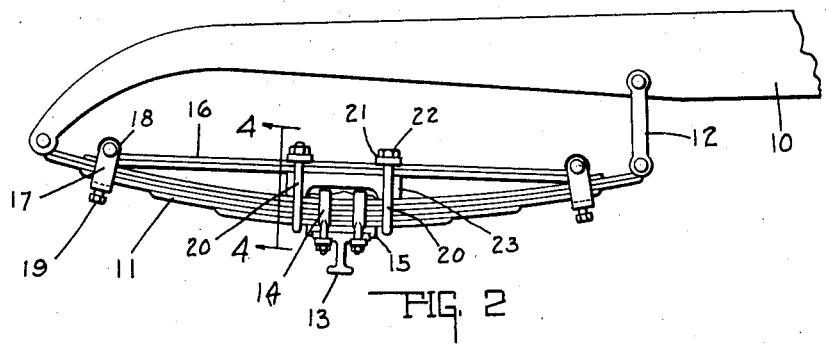
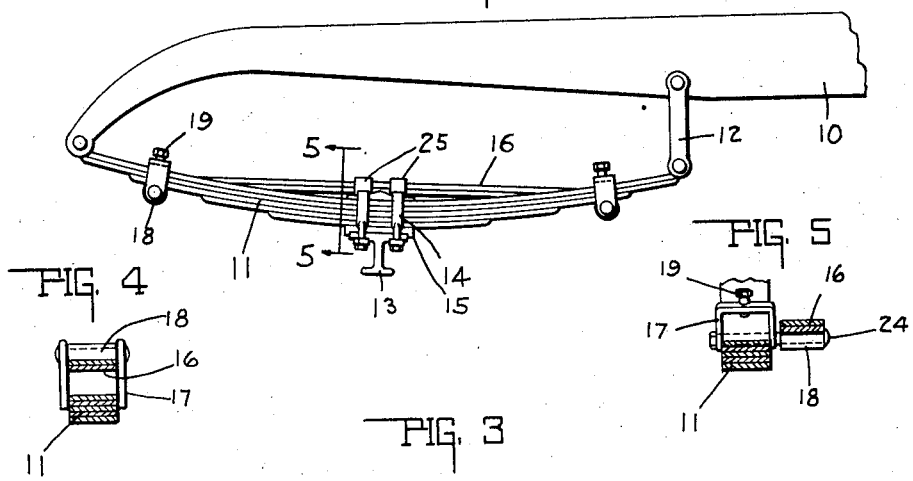
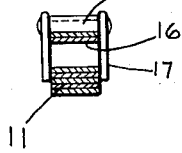
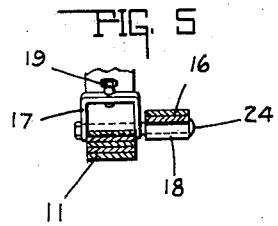
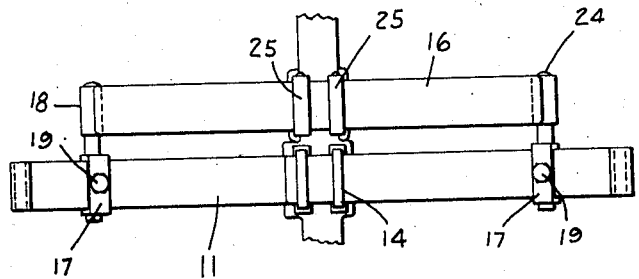
INVENTOR
JAMES WOOD.
BY
Lockwood Lockwood
ATTORNEYS.

UNITED STATES PATENT OFFICE.

JAMES WOOD, OF NOBLESVILLE, INDIANA.

SHOCK-ABSORBER.

1,391,035.  Specification of Letters Patent.  Patented Sept. 20, 1921.

Application filed January 30, 1920. Serial No. 355,129.

*To all whom it may concern:*

Be it known that I, JAMES WOOD, a citizen of the United States, and a resident of Noblesville, county of Hamilton, and State of Indiana, have invented a certain new and useful Shock-Absorber; and I do hereby declare that the following is a full, clear, and exact description thereof, reference being had to the accompanying drawings, in which like numerals refer to like parts.

The chief object of this invention is to provide a vehicle with a shock absorber which is of simple construction and is particularly adapted to be positioned adjacent a vehicle supporting leaf spring of the semi-elliptic type.

One feature of the invention consists in forming the shock absorbing means of flat spring members and positioning the same adjacent the vehicle or body spring to lie flat or straight when the body is subjected to the normal load of the vehicle and to reduce the oscillation of the body spring to a minimum.

The full nature of the invention will be understood from the accompanying drawings and the following description and claim.

In the drawings Figure 1 is a side view of the rebound or shock absorbing spring applied to a body spring and shows the same positioned above the body spring. Fig. 2 is a similar view of the invention and shows the same positioned to one side of the vehicle or body spring. Fig. 3 is a top plan view of the spring shown in Fig. 2. Fig. 4 is a cross sectional view taken on line 4—4 of Fig. 1. Fig. 5 is a similar view taken on line 5—5 of Fig. 2.

In the drawings 10 indicates the frame of a vehicle. A semi-elliptic body spring 11 of the usual construction is pivotally secured at one end to the frame portion 10, and at the other end to the frame by link means 12. Positioned centrally beneath the vehicle spring 11 and secured thereto is a wheel supporting member 13. Herein the wheel supporting member 13 is secured to said vehicle spring by means of clamps 14 and a plate 15, all of which are of the usual construction. Supported upon the spring 11, as shown clearly in Figs. 1 and 4, are a plurality of flat spring members 16, said members when the vehicle is normally loaded, being adapted to lie straight or flat. The opposite ends of the spring member 16 are secured to the vehicle spring 11 near the ends thereof by means of a clamp 17 carrying a roller bearing 18 and an adjusting screw 19 by which the clamp is secured upon the vehicle spring to retain the end of the auxiliary spring 16.

The central portion of the auxiliary or rebound spring 16 is secured to the vehicle spring by means of a pair of clamping U bolts 20, cross bars 21 and nuts 22. Positioned between said rebound spring 11 is a spacing block 23 upon which the auxiliary spring fulcrums when the vehicle spring is moving.

When the vehicle spring is subjected to a shock, the spring 11 tends to flatten, and the auxiliary spring 16, under the influence of said vehicle spring and the spacing block 23, bends downwardly to resist the flattening of the vehicle spring. Upon the rebound the vehicle spring tends to contract and causes the auxiliary spring 16 to bend in the opposite direction, which bending opposes the oscillation of the vehicle spring. Thus, when the vehicle spring 11 is subjected to a shock, the auxiliary spring 16 absorbs or counteracts the greater portion thereof and tends to maintain the vehicle spring 11 in substantially stationary position, instead of having the same oscillate between the extreme positions it would normally assume were the rebound or shock absorbing means not provided.

In Figs. 2, 3 and 5 a modified arrangement is disclosed. In this instance, instead of the auxiliary spring being positioned above the vehicle spring, it is secured to the same at one side thereof. Herein the clamps for securing the auxiliary spring ends to the vehicle spring 11 are modified, as shown clearly in Figs. 3 and 5. In this instance, the clamp 17 is reversely positioned upon the vehicle spring, and extending through the same is a pin bolt 24, the outwardly extending end thereof being suitably secured to the auxiliary spring 16. A plurality of suitable clamping means 25 secure the central portion of said auxiliary spring to the wheel supporting portion 13 or the axle supporting the wheel.

The operation of the vehicle spring 11 and the auxiliary spring 16 is similar to that previously described in regard to the construction shown in Figs. 1 and 4. In the construction shown in Figs. 2, 3 and 5, when the vehicle spring 11 is flattened by a shock, the center of the auxiliary spring is moved upwardly therewith to oppose said flattening, and upon the rebound, the ends of the auxiliary spring are bent upwardly to again oppose the same. In this manner the auxiliary spring 16 always tends to return the spring 11 to the normal position with a minimum of oscillation.

The invention claimed is:

In combination with a shock absorber for a vehicle including a semi-elliptic body spring, and an auxiliary spring positioned adjacent the body spring for opposing the rebound thereof, and means for securing the central portion of said springs together, of a clamp for securing the opposite ends of said auxiliary spring to the body spring, including a roller bearing mounted in said clamp for permitting the longitudinal movement of said auxiliary spring with respect to said vehicle spring, and an adjustable lock bolt adapted to screw through the opposite end of said clamp from said roller into engagement with the vehicle spring for rigidly clamping said clamp thereto, whereby said clamp may be adjustable to vehicle springs of varying thicknesses.

In witness whereof I have hereunto affixed my signature.

JAMES WOOD.